United States Patent [19]

Burgei et al.

[11] Patent Number: 4,795,002
[45] Date of Patent: Jan. 3, 1989

[54] ELECTRICALLY OPERATED ACTUATOR FOR REAR PARKING BRAKE CABLES INCLUDING DRIVER AND DRIVEN MEMBERS ROTATABLY MOUNTED ABOUT SAME PIVOT PIN

[75] Inventors: Russel J. Burgei; William W. Schap, both of Jackson, Mich.

[73] Assignee: ITT Corporation, New York, N.Y.

[21] Appl. No.: 146,469

[22] Filed: Jan. 21, 1988

[51] Int. Cl.$^4$ ............................ B60T 13/74; B60T 1/00
[52] U.S. Cl. ................................. 188/2 D; 49/349;
49/352; 74/89.18; 74/89.2; 74/471 R; 74/500.5;
188/106 R; 188/156; 188/158; 188/162;
303/6.01
[58] Field of Search .......... 188/2 D, 2 R, 158, 106 R,
188/162, 106 F, 156, 106 P, 16, 24.16, 157;
74/89.2, 471 R, 501 R, 501 B, 89.18, 89.19;
192/82, 84 R; 318/372, 685; 303/6 A, , 6;
49/352, 349, 322

[56] References Cited

U.S. PATENT DOCUMENTS

| | | | |
|---|---|---|---|
| 1,501,600 | 7/1924 | Hartford | 188/162 |
| 1,582,378 | 4/1926 | Brueckmann | 74/501 R |
| 2,515,468 | 7/1950 | Piron | 188/162 X |
| 2,734,590 | 2/1956 | Hays, Jr. | 188/162 X |
| 2,899,022 | 8/1959 | White | 188/106 R X |
| 2,912,072 | 11/1959 | Jones | 188/106 R X |
| 3,136,177 | 6/1964 | Roberts et al. | 188/82.6 X |
| 3,270,840 | 9/1966 | DeClaire | 188/106 P X |
| 3,348,638 | 10/1967 | Littmann | 188/106 R X |
| 3,353,634 | 11/1967 | Farrar | 188/162 X |
| 3,455,418 | 7/1969 | Littmann | 188/106 F X |
| 3,539,038 | 11/1970 | Taber | 188/162 |
| 3,576,136 | 4/1971 | Myers | 74/89.2 |
| 3,638,766 | 2/1972 | Besoyan | 188/162 X |
| 3,675,371 | 7/1972 | Golde et al. | 74/89.2 X |
| 3,812,750 | 5/1974 | Meyer | 188/162 X |
| 3,830,328 | 8/1974 | Schaefer et al. | 188/265 X |
| 3,880,262 | 4/1975 | Besoyan | 188/162 X |
| 4,031,987 | 6/1977 | Webb | 188/75 |
| 4,057,127 | 11/1977 | Woodring | 188/24.16 |
| 4,175,646 | 11/1979 | Eikelberger | 188/162 |
| 4,196,797 | 4/1980 | Taylor | 188/181 T X |
| 4,198,877 | 4/1980 | Huling | 74/501 R |
| 4,203,430 | 5/1980 | Takahashi | 74/501.5 R X |
| 4,281,736 | 8/1981 | Lizzio | 188/106 R X |
| 4,381,625 | 5/1983 | Andrei-Alexandru et al. | 49/349 X |
| 4,460,838 | 7/1984 | Ulicny | 188/69 X |
| 4,478,004 | 10/1984 | Andrei-Alexandru et al. | 49/349 X |
| 4,483,421 | 11/1984 | Kennelly | 188/106 P X |
| 4,520,907 | 6/1985 | Sikora | 188/156 |
| 4,530,474 | 7/1985 | Nederman | 188/185 X |
| 4,644,816 | 2/1987 | Cockburn | 74/501 R |
| 4,649,329 | 3/1987 | Wickham | 318/372 |

FOREIGN PATENT DOCUMENTS

| | | | |
|---|---|---|---|
| 1030858 | 5/1958 | Fed. Rep. of Germany | 188/162 |
| 0957019 | 2/1950 | France | 188/24.16 |
| 1139504 | 12/1955 | France | 188/162 |
| 0143745 | 8/1984 | Japan | 188/2 D |
| 0143746 | 8/1984 | Japan | 188/2 D |
| 2029502 | 3/1980 | United Kingdom | 49/352 |

Primary Examiner—Douglas C. Butler
Attorney, Agent, or Firm—James B. Raden

[57] ABSTRACT

An electrically operated parking brake actuator for use with vehicles includes a motor operated driver member and an associated driven member. Each of the driver member and driven member is mounted for rotation about the same pivot pin and each is connected to a cable. Each cable is associated with a parking brake member. The motor operates the driver to drive the driven member which, in turn, tensions its associated cable to apply its associated parking brake member. This cable tension reacts through the actuator and drives the driver member in the opposite direction to tension the other cable and apply its associated brake.

14 Claims, 3 Drawing Sheets

ELECTRICALLY OPERATED ACTUATOR FOR REAR PARKING BRAKE CABLES INCLUDING DRIVER AND DRIVEN MEMBERS ROTATABLY MOUNTED ABOUT SAME PIVOT PIN

BACKGROUND OF THE INVENTION

This invention relates to a parking brake actuator and a parking brake system and, more particularly, to an electrically operated parking brake actuator and system for automotive vehicles.

Electrically operated parking brake actuators have been proposed for setting and releasing the parking brake of an automotive vehicle. These actuators generally include an electric motor connected to a parking brake cable system through a gear train including a sector to which a main brake cable is attached. This main brake cable is connected to a pair of cables each of which is, in turn, connected to a parking brake member. Each parking brake member is associated with a different wheel of the vehicle. Typically the motor and gear train are located in the cockpit of the vehicle although some proposals have located them under the hood adjacent the firewall. To set the parking brake, the motor and, in turn, the gear train are driven in one direction so that the sector tensions the main brake cable which, in turn, tensions the cable pair and applies the parking brake; to release the brake, the motor and gear train are driven in the opposite direction to relieve the tension in the cable system and release the brake.

These prior art systems are too expensive to be widely used. The expense results from a variety of requirements necessitated by the design. A relatively large motor and gear train arrangement are required to provide enough force to tension the cables. The bulk of the gear trains is also utilized to prevent backloading (a force acting to release the brake) the gears and/or motor when the cables are tensioned.

Assembling these systems to a vehicle is also expensive. This expense results from the need to adjust the slack in the cable when the assembly is installed on the vehicle. Usually the slack is removed so that a predetermined minimal tension is left in the cables when the brake is released. Repeatability of the cable tension has also been a problem and often results in a maintenance expense. The predetermined tension relaxes over the life of the vehicle as the cables wear and stretch. Thus adjustment is required to remove the slack after the vehicle has been in use. Some systems address this problem by including an automatic slack adjuster. This additional feature adds to the cost and complexity of the parking brake system.

SUMMARY OF THE INVENTION

It is an object of this invention to provide an electric tensioning device for parking brake cables (or similar tensioning apparatus) which device is relatively small, simple and inexpensive.

It is another object of this invention to provide an electric tensioning device for parking brake cables which device is arranged to provide an action-reaction force cancellation that allows for the use of relatively small and simple drive arrangements.

It is still another object of this invention to provide an electrically operated tensioning device for parking brakes that eliminates the need for slack adjustment and assures repeatability of the tension.

Finally, it is an object of this invention to provide an electrically operated tensioning device for parking brakes wherein the device can be accommodated outside the vehicle cockpit.

These and other objects are accomplished by providing an electrically operated cable tensioning device for automotive parking brakes comprising driver means including an electric motor operatively associated with driven means. The driver and driven means are rotatably mounted about a pivot pin so that they are rotatable independent of each other. The driver means also includes first attaching means for securing a first cable adapted to be attached to a first parking brake member associated with a first wheel and the driven means includes a second attaching means for securing a second cable adapted to be attached to a second parking brake member associated with a second wheel. When the motor is operated the driver means and the driven means rotate in opposite directions and either tension or release their associated cable depending on the direction of rotation.

Preferably the electric motor includes a torque limiting system so that it shuts-off at a predetermined torque. It is also preferable that the attaching means are arranged so that the first and second cables are parallel to each other when the cables are tensioned.

BRIEF DESCRIPTION OF THE DRAWING

For a better understanding of the invention reference is made to the following Description of a Preferred Embodiment taken in conjunction with the accompanying drawing in which.

DETAILED DESCRIPTION OF A PREFERRED EMBODIMENT

Figure 1:
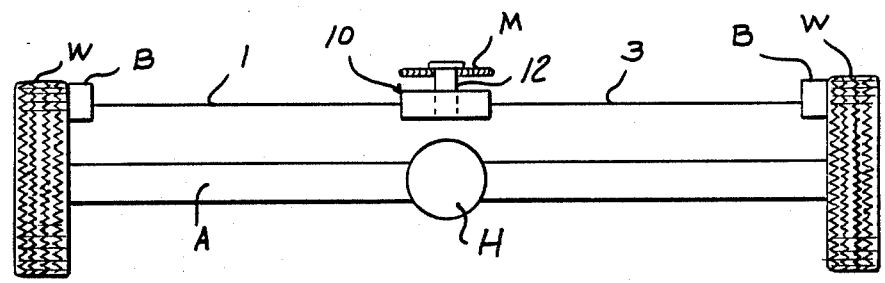
FIG. 1 is a schematic illustration of an automotive vehicle's axle and wheel assembly showing cables for operating the parking brakes and an electric actuator in accordance with this invention.

FIG. 1 shows an automotive vehicle axle assembly including a rear axle A having a universal housing H and associated with a pair of rear wheels W, W. While the preferred embodiment discloses the invention in conjunction with the rear axle and wheels of a vehicle it should be understood that it can be used in conjunction with the front axle and its associated wheels as well as with wheels not requiring an axle system. Each wheel is associated with parking brake B each of which is operative to hold its associated wheel W against rotation when the brake is applied. Conversely, each parking brake B allows its associated wheel to rotate when it is released. To apply or release the parking brakes B, B, there is also provided a first cable 1 associated with one of the brakes B and a second cable 3 associated with the other brake. When the cables are tensioned they apply the brakes and when they are relaxed they release the brakes.

An actuator 10, shown schematically in FIG. 1, is associated with the adjacent ends of cables 1 and 3 to apply or relax the tension that applies or releases the brakes. The actuator 10 is located outside the vehicle body and in the preferred embodiment is located above the axle A so that it is aligned with the cables 1 and 3. Other locations can be utilized to accommodate the actuator 10 depending on the space available in the vehicle with which it is used. Thus, for example the actuator 10 can be located in the trunk compartment or other available location. The actuator 10 is carried on a pivot pin 12 fixed to the underneath of a rigid body member M. As should be understood the actuator 10 is electrically connected to a switch located in the cockpit of the vehicle and to an energy source such as the battery so that a vehicle driver operates the switch to apply or release the parking brakes. For reasons to be made clear hereinafter, the use of a toggle switch is preferred.

Figure 4:
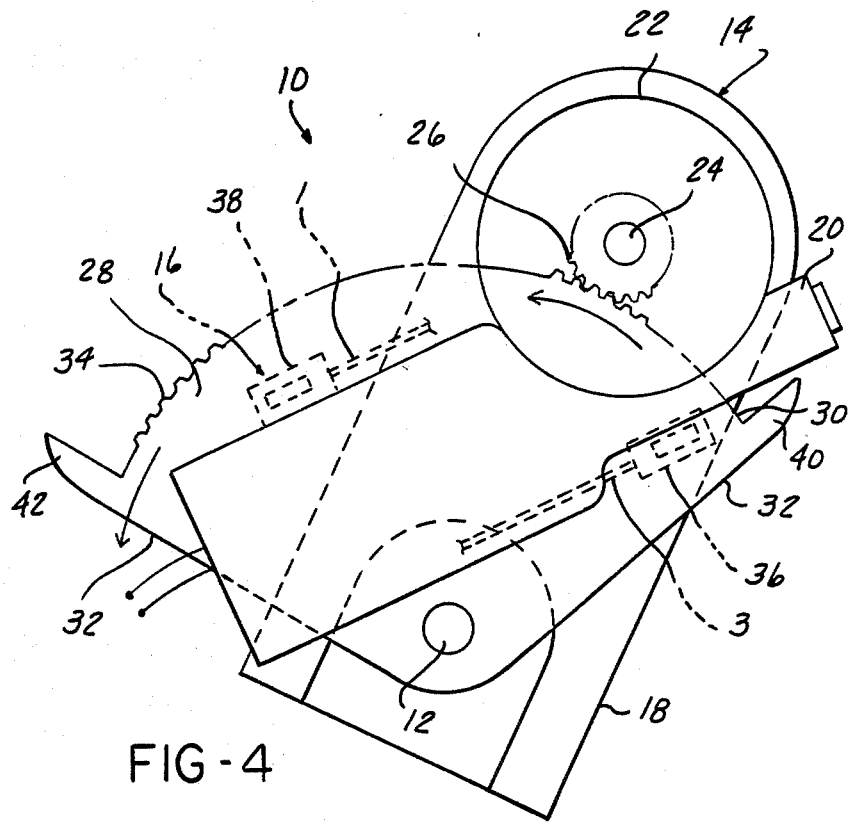
FIG. 4 is a plan view looking in the direction of arrows A—A of FIG. 2 and illustrating the braking position wherein an associated parking brake is applied.
Figure 2:
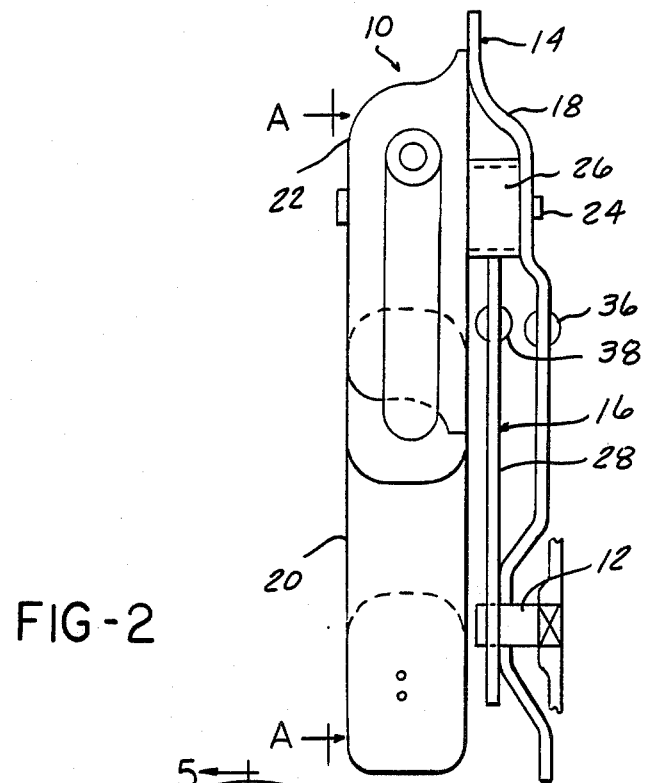
FIG. 2 is a side elevation of the electric actuator schematically illustrated in FIG. 1.
Figure 3:
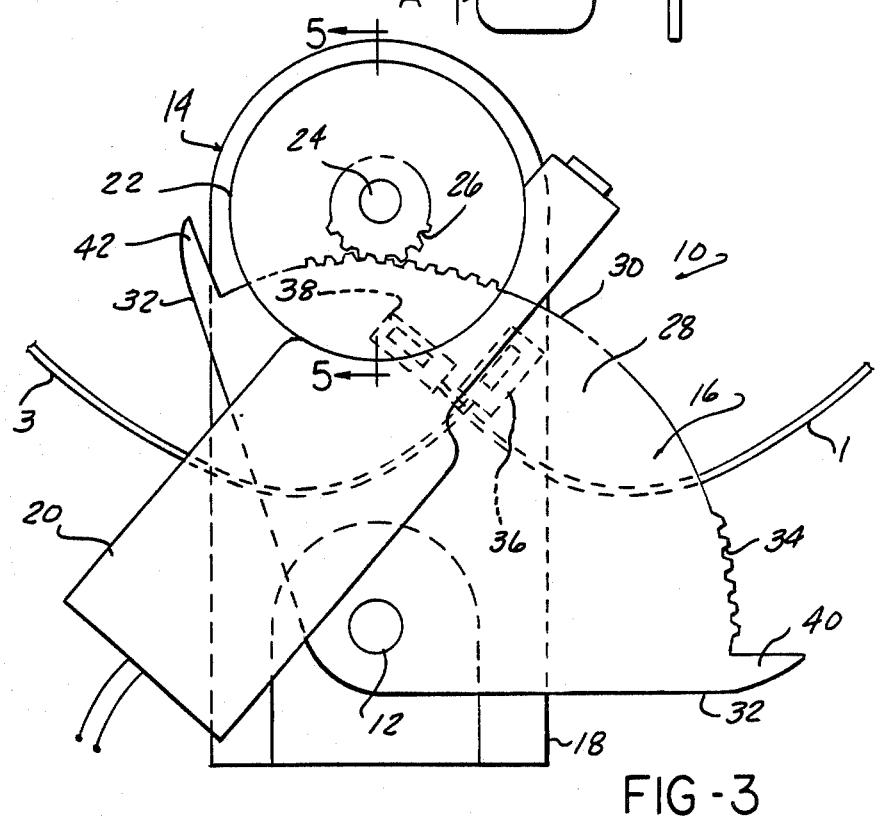
FIG. 3 is a plan view looking in the direction of arrows A—A of FIG. 2 and illustrating the released position wherein an associated parking brake is released.

FIGS. 2-4 illustrate a preferred embodiment of the actuator 10. It comprises a driver means 14 and a driven member 16 each rotatably mounted to the pivot pin 12. The driver means 14 is connected to the cable 3 and the driven member 16 is connected to the cable 1. When the driver means 14 is operative to drive the driven member in one direction, the driver means 14 and the driven member 16 rotate in opposite directions relative to each other about the pivot pin 12 so that they move from the positions illustrated in FIG. 3 to the positions illustrated in FIG. 4 and tension the cables 1 and 3 to apply the brakes B, B. Operation of the driver means 14 in the opposite direction causes the driver means 14 and driven member 16 to rotate in directions opposite that previously described, and it should be understood in opposite directions relative to each other, about the pivot pin 12 so that they move from the positions illustrated in FIG. 4 to the positions illustrated in FIG. 3 and relax the tension on the cables 1 and 3 to release the brakes B, B.

The driver means 14 includes an elongated mounting bracket 18 which is rotatably mounted adjacent one end to the pivot pin 12. At its other end the mounting bracket 18 is fixed to an electric motor 20. It is this motor 20 that is connected to the switch in the vehicle cockpit and also to a source of electrical energy so that it can drive a motor output shaft (not shown) in either direction. The motor 20 can be any conventional type, but should include a torque limiting means so that its output torque is limited to a predetermined level. Preferably, the motor 20 is arranged to stall at a predetermined torque; alternatively it can include torque sensors and an associated control switching system.

Figure 5:
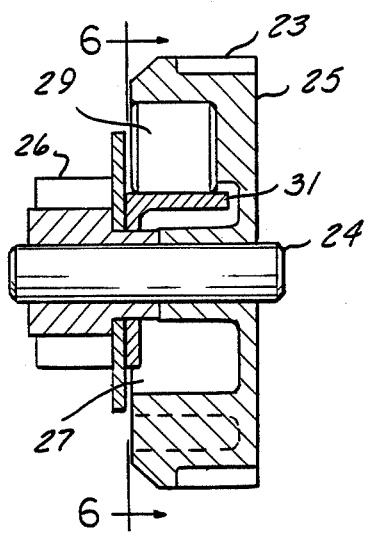
FIG. 5 is a section view taken generally along the line 5—5 of FIG. 3 and illustrating a gear train usable with this invention.
Figure 6:
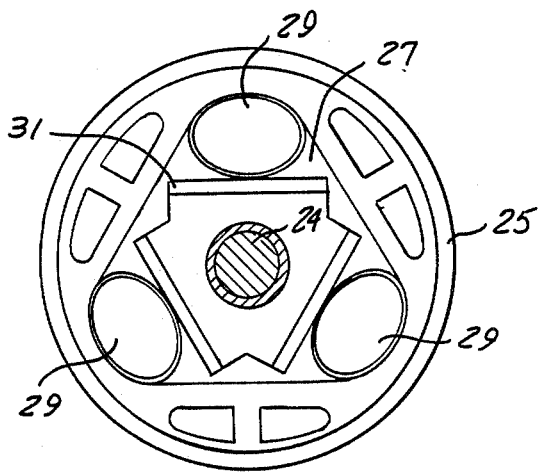
FIG. 6 is a view taken along the line 6—6 of FIG. 5.

At the output end of the motor 20 is a gearbox 22 containing a suitable gear train for driving a drive pinion 26 in one or the other direction depending on the direction of rotation of the motor output shaft. In the preferred embodiment, as seen in FIGS. 5 and 6, the motor output shaft is formed with a worm gear (not shown) which meshes with the teeth 23 formed on a plastic pinion 25 so that the worm gear drives the plastic pinion. The pinion 25 is rotatably mounted on a locating pin 24 carried in the gearbox. The driver pinion 26 is also rotatably mounted on the locating pin 24. Finally, the pinion 25 and driver pinion 26 are operatively coupled together so that they rotate together. The coupling is provided by a generally triangular recess 27 formed in the outer face of the pinion 25. Each vertex of the triangle is formed with an arcuate contour and a plastic absorber 29 is located at each arcuate vertex. The driver pinion 26 is associated with a sleeve portion 31 having a polygonal external shape, as best seen in FIG. 6, so that each absorber 29 is in bearing engagement with outer surfaces of the sleeve. Thus, the pinion 25 and driver pinion 26 are coupled for rotation and, in the event of overtorquing, the plastic absorbers 29 deform to accommodate the outer surfaces of the sleeve 31 and prevent them from shearing. This coupling arrangement is rather conventional in the art and has been used in the motors associated with window regulators. Any other suitable arrangement could be utilized.

The driven member 16 comprises a plate member 28 shaped, in plan view, generally in the form of a quadrant of a circle. Thus, it has an arcuate edge 30 and a pair of radially extending edges 32, 32 joined together adjacent the center of the circle so that the center of the circle is located on the plate member. Adjacent the intersection of the radially extending edges 32, 32 and at the center of the circle, the quadrant or plate member 28 is rotatably carried on the pivot pin 12. The arcuate edge 30 is formed with teeth 34 that mesh with the teeth on the drive pinion 26.

The mounting bracket 18 carries a mounting means 36 for connecting the cable 3 so that it is attached to the driver means 14. The plate member 28 carries a similar mounting means 38 for connecting the cable 1 so that it is attached to the driven member 16. The mounting means 36 and 38 are elongated tabs struck out of the sheet metal forming the bracket 18 and plate member 28 and the tabs are formed with slots for receiving enlargements on the end of the cables 1 and 3. Obviously, any conventional attaching arrangement can be used. The mounting means 36 and 38 are located on the mounting bracket 18 and plate member 28 so that in the release position shown in FIG. 3 they do not tension the cable and so that when they move to the braking position shown in FIG. 4, they tension them. In the embodiment disclosed here the mounting means 36 and 38 have been located to accommodate the requirements of a specific vehicle and, in FIG. 3, the cables 1 and 3 curve from a straight line path extending from the brake B to the actuator 10 and the mounting means 36 and 38 are circumferentially spaced apart so that, in plan view, the cables 1 and 3 cross each other.

When the driver means 14 and the driven member 16 rotate toward the braking position shown in FIG. 4, they rotate in a direction to straighten the cables 1 and 3 so that in the braking position the cables are parallel to each other and extend in a generally straight line from the actuator 10 to the parking brakes B, B. The parallel relationship between the cables 1 and 3 maximizes the benefits of this invention. In this position the force exerted on the actuator 10 by the cable 1 is equal and opposite the force exerted by the cable 3 so that the actuator 10 is self-centering. In theory, there would be no need to use a pin 12 to mount the actuator 10 since the cables 1 and 3 hold it in static equilibrium.

Another significant advantage of this invention stems from the action-reaction force arrangement of the cables 1 and 3. As the motor 20 drives the pinion 25 and 26, the latter drives the plate member 28 and tensions the cable 1. As the cable 1 is tensioned, this force reacts through the actuator 10 and this reaction force pulls the bracket 18 in the opposite direction to tension the cable 3. Thus, the motor and gear train drive and tension only one cable and the need for a large, powerful assembly is obviated. Moreover, the cable tensions are generally equal.

Additionally, slack adjustment is not required and cable tension is repeatable. Because of the torque sensitive motor and the action/reaction cable arrangement, the self-centering effect is achieved at a predetermined torque which is, of course, related to a specified tension. Thus, the slack is taken out of the cables and a predetermined torque and tension are consistently obtained.

Finally, by operating a toggle switch in the vehicle cockpit, the parking brake can be modulated between on, off and reverse to apply the parking brakes in the event of a hydraulic brake failure. With proper design regarding the strength of the actuator 10, the parking brake can stop the vehicle if need be.

The plate member 28 is formed with stop members 40, 42 at the ends of the arcuate edge 30 and these stop members are readily formed as integral extensions of the straight edges 32, 32. The stops 40, 42 keep the quadrant from disengaging from the driver pinion 26 in the event of a cable failure. The stop 42 also operates to turn the motor 20 off when the actuator 10 is releasing the brakes B, B. During release, the driver pinion 26 drives the plate member 28 until the stop 42 eventually contacts the bracket 18. When this contact is made the motor 20 develops a torque large enough to stall or otherwise shut-off the motor.

While in the foregoing there has been described a preferred embodiment of the actuator, it should be understood by those skilled in the art that various modifications and changes can be made within the spirit and scope of the invention as recited in the accompanying claims.

What is claimed is:

1. An electrically operated parking brake actuator comprising driver means including an electric motor, driven means operatively associated with the driver means, each of said driver means and said driven means being mounted for rotation about a pivot pin, first mounting means carried on said driver means for attaching a first cable thereto so that it extends along a first axis and second mounting means carried on said driven means for attaching a second cable thereto so that it extends along a second axis, said first and second mounting means being located so that in a first position of said driver and driven means cables attached to said mounting means are tensioned and so that in a second position of said driver and driven means cables attached thereto are relaxed.

2. An electrically operated parking brake actuator in accordance with claim 1 wherein in said first position the axes of said first and second mounting means are parallel.

3. An electrically operated parking brake actuator in accordance with claim 2 wherein in said second position the axes of said first and second mounting means intersect.

4. An electrically operated parking brake actuator in accordance with claim 1 wherein said electric motor is a torque limiting motor that stops operation at a predetermined torque.

5. An electrically operated parking brake actuator in accordance with claim 1 wherein said driver means includes a gear train operatively associated with said electric motor, said gear train including a driver pinion and wherein said driven means includes a plate member formed with teeth along an arcuate edge, said teeth meshing with said driver pinion.

6. An electrically operated parking brake actuator in accordance with claim 5 wherein stop means are formed at each end of said arcuate edge.

7. An electrically operated parking brake actuator in accordance with claim 5 wherein said motor is fixed to a bracket member and wherein said bracket member and said plate member are carried by said pivot pin.

8. An electrically operated parking brake system comprising an actuator, first and second cables extending from opposite sides of said actuator, each cable being connected to a parking brake member, said actuator comprising driver means including an electric motor, driven means operatively associated with the driver means, each of said driver means and said driven means being mounted for rotation about a pivot pin, first mounting means carried on said driver means for attaching said first cable thereto and second mounting means carried on said driven means for attaching said second cable thereto, said first and second mounting means being located so that in a first position of said driver and driven means said cables are tensioned to apply their associated parking brake member and so that in a second position of said driver and driven means said cables are relaxed to release their associated parking brake member.

9. An electrically operated parking brake system in accordance with claim 8 wherein said first and second cables are parallel to each other in the first position.

10. An electrically operated parking brake system in accordance with claim 9 wherein said first and second cables cross each other in the second position.

11. An electrically operated parking brake system in accordance with claim 8 wherein said electric motor is a torque limiting motor that stops operation at a predetermined torque.

12. An electrically operated parking brake system in accordance with claim 8 wherein said driver means includes a gear train operatively associated with said electric motor, said gear train including a driver pinion and wherein said driven means includes a plate member formed with teeth along an arcuate edge, said teeth meshing with said driver pinion.

13. An electrically operated parking brake system in accordance with claim 12 wherein stop means are formed at each end of said arcuate edge.

14. An electrically operated parking brake system in accordance with claim 12 wherein said motor is fixed to a bracket member and wherein said bracket member and said plate member are carried by said pivot pin.

* * * * *